(12) United States Patent
Pan

(10) Patent No.: US 7,401,383 B2
(45) Date of Patent: Jul. 22, 2008

(54) HINGE CONNECTOR FOR FOLDING-TYPE ELECTRONIC APPARATUS

(75) Inventor: Long-Jyh Pan, Taoyuan (TW)

(73) Assignee: Qsida Corporation, Taoyuan (TW)

( * ) Notice: Subject to any disclaimer, the term of this patent is extended or adjusted under 35 U.S.C. 154(b) by 236 days.

(21) Appl. No.: 11/129,233

(22) Filed: May 14, 2005

(65) Prior Publication Data

US 2005/0283945 A1 Dec. 29, 2005

(30) Foreign Application Priority Data

May 14, 2004 (TW) .............................. 93113775 A

(51) Int. Cl.
*E05D 5/10* (2006.01)
(52) U.S. Cl. .............................. 16/367; 16/330; 16/386
(58) Field of Classification Search .................. 16/367, 16/368, 330, 386, 303, 382; 248/919–923; 348/373, 333.06, 794; 379/433.12, 433.13; 455/575.1, 575.4, 575.8, 550.1, 90.3; 361/680–683
See application file for complete search history.

(56) References Cited

U.S. PATENT DOCUMENTS

| | | | |
|---|---|---|---|
| 5,141,446 A | 8/1992 | Ozouf et al. ................. 439/165 |
| 5,394,297 A | 2/1995 | Toedter ...................... 361/683 |
| 6,256,837 B1 * | 7/2001 | Lan et al. ...................... 16/334 |
| 6,616,467 B2 * | 9/2003 | Ibaraki et al. ................ 439/165 |
| 6,742,221 B2 * | 6/2004 | Lu et al. ......................... 16/367 |
| 6,804,861 B2 * | 10/2004 | Hsu ............................. 16/366 |
| 6,867,961 B2 * | 3/2005 | Choi ........................... 361/681 |
| 7,150,074 B2 * | 12/2006 | Shiba ........................... 16/367 |
| 2005/0141703 A1 * | 6/2005 | Hickey et al. .......... 379/433.13 |
| 2005/0245294 A1 * | 11/2005 | Gupte et al. ............. 455/575.1 |

FOREIGN PATENT DOCUMENTS

| CN | 1496179 A | 5/2004 |
|---|---|---|
| JP | 10340134 A * | 12/1998 |

* cited by examiner

*Primary Examiner*—Chuck Y. Mah
(74) *Attorney, Agent, or Firm*—Birch, Stewart, Kolasch & Birch, LLP

(57) ABSTRACT

The invention provides a hinge connector for a folding-type electronic apparatus including a first housing, a second housing, a first electronic unit disposed in the first housing, and a second electronic unit disposed in the second housing. The hinge connector, according to the invention, includes a first shaft member, a second shaft member, a frame member and a flexible conductive element. By the hinge connector according to the invention, the second housing is capable of rotating around two axes relative to the first housing, and the first electronic unit electrically connects with the second electronic unit. In particular, during the operation of the electronic apparatus, the portion of the flexible conductive element within the first shaft member and the second shaft member is twisted rather than bent.

19 Claims, 7 Drawing Sheets

HINGE CONNECTOR FOR FOLDING-TYPE ELECTRONIC APPARATUS

BACKGROUND OF THE INVENTION

1. Field of the Invention

The present invention relates to a hinge connector used in a folding-type electronic apparatus for assisting in connecting a folder module of the electronic apparatus to a main module of the electronic apparatus. Moreover, the folder module is rotatable around two axes relative to the main module. A first electronic unit of the main module is electronically connected with a second electronic unit of the folder module. The related prior arts are listed as follows:

[1] U.S. Pat. No. 6,616,467;
[2] U.S. Pat. No. 5,394,297;
[3] U.S. Pat. No. 5,141,446; and
[4] The mobile phone of Samsung with the model number of SGH-P408.

2. Description of the Prior Art

The folding-type electronic apparatus is often utilized in designs of electronic consumer products, e.g. mobile phone, personal digital assistant (PDA), digital camera (DC), notebook, and so on. The typical folding-type electronic apparatus comprises a main module and a folder module. The main module consists of a first housing and a first electronic unit disposed in the first housing. The folder module consists of a second housing and a second electronic unit disposed in the second housing.

The so-called folding-type electronic apparatus is that the folder module thereof utilizes a hinge connector to connect the second housing and the first housing, such that the second housing is rotatable around an axis or two axes relative to the first housing. When the second housing rotates around an axis relative to the first housing, the hinge connector can rotate in one degree of freedom. When the second housing rotates around two axes relative to the first housing, the hinge connector can rotate in two degrees of freedom. Moreover, the second electronic unit of the second housing is electronically connected to the first electronic unit of the first housing by arranging the hinge connector with a flexible conductive element, e.g. a flexible printed circuit board (FPCB) or a coaxial cable.

However, for the hinge connector capable of rotating in one degree of freedom, the flexible conductive element will be exposed to destructive bending stress while the folding-type electronic apparatus is folded, resulting in broken circuit or short circuit in the tiny circuit of the flexible conductive element. For the hinge connector capable of rotating in two degrees of freedom, the flexible conductive element will be exposed to even more destructive bending stress while the folding-type electronic apparatus is folded. For the flexible conductive element of the hinge connector capable of rotating in one degree of freedom, although the prior arts have proposed some special designs for reducing the bending stress of the flexible conductive element or for reducing the occurrence of broken circuit or short circuit while the tiny circuit of the flexible conductive element is being exposed to the bending stress, the above prior arts not only cannot be applied to the hinge connector capable of rotating in two degrees of freedom but also cost a lot.

Furthermore, the assembly of the general hinge connector capable of rotating in two degrees of freedom is always complex, so that the manufacturing cost of the folding-type electronic apparatus is raised.

Therefore, an objective of the present invention is to provide a hinge connector for a folding-type electronic apparatus, wherein the hinge connector can rotate in two degrees of freedom. Especially, according to the hinge connector of the present invention, the flexible conductive element receives a twisting stress instead of a destructive bending stress while the electronic apparatus is being folded.

Another objective of the present invention is to provide a hinge connector for a folding-type electronic apparatus, wherein the hinge connector can rotate in two degrees of freedom and can be assembled easily.

SUMMARY OF THE INVENTION

According to a preferred embodiment of the present invention, a hinge connector is applied to a folding-type electronic apparatus. The folding-type electronic apparatus comprises a first housing, a second housing, a first electronic unit disposed in the first housing, and a second electronic unit disposed in the second housing. The hinge connector comprises a first substantially hollow shaft member, a second hollow shaft member, a frame member, and a flexible conductive element. The first shaft member has a first end, a second end, an opening, and a first formed-through slit. The first slit extends from the opening to the first end of the first shaft member. The first shaft member is pivotally attached onto the first housing, such that the first shaft member is rotatable around a first axis relative to the first housing. The second hollow shaft member has a third end, a fourth end, and a second formed-through slit. The second slit extends from the third end to the fourth end of the second shaft member. The second shaft member is, via the third end thereof, inserted in the opening and mounted onto the first shaft member. The frame member has a supporting portion and a hollow portion. A hole, which is adapted to an external diameter of the second shaft member, and a third formed-through slit are formed on the hollow portion. The frame member is, via the supporting portion, mounted onto the second housing. The second shaft member is inserted through of the hole of the frame member to make the frame member rotatably attached onto the second shaft member, such that the second housing together with the frame member are rotatable around a second axis relative to the second shaft member. The flexible conductive element has a first portion, a second portion, and a third portion. During the assembly of the hinge connector, the first slit is aligned with the second slit and the third slit to let the flexible conductive element pass through the first slit, the second slit, and the third slit; then, the second portion of the flexible conductive element is disposed within the first shaft member and the second shaft member. The first portion of the flexible conductive element is exposed outside the first shaft member and disposed in the first housing to provide the first electronic unit with electrical connection. The third portion of the flexible conductive element is exposed outside the second shaft member and disposed in the second housing to provide the second electronic unit with electrical connection. Accordingly, during the operation of the folding of the electronic apparatus, the second portion of the flexible conductive element within the first shaft member and the second shaft member is being twisted rather than bent.

According to an embodiment of the present invention, the fourth end of the second shaft member is made in a form of a cam. The hollow portion of the frame member has an opening and two slots disposed on two opposite inner walls thereof. The cam is disposed through the opening of the hollow portion and within the hollow portion of the frame member. The hinge connector further comprises one pair of resilient members respectively inserted in the two slots of the frame member, and they resiliently press against the profile of the cam, such that the pair of resilient members induces one pair of opposite action forces on the profile of the cam. During the rotation of the frame member relative to the second shaft member, the pair of opposite action forces is applied in alternately coaxial or non-coaxial direction to position the frame member relative to the second shaft member.

According to an embodiment of the present invention, the hinge connector further comprises a first hollow cam, a second hollow cam, and at least one resilient member. The first hollow cam is disposed on the opening of the first shaft member. The first cam has a fourth formed-through slit and a top surface on which staggered N peaks and N valleys are provided, wherein N is a natural number. The second hollow cam has a fifth formed-through slit, a top surface, on which at least one second recess is provided, and a lower surface on which N peaks and N valleys for mating the valleys and peaks on the top surface of the first cam. The second cam, via the lower surface thereof, contacts the top surface of the first cam and is disposed on the first cam. Each resilient member is disposed in one of the second recess. The first cam together with the second cam is disposed through the opening of the hollow portion and within the hollow portion of the frame member. All resilient members are compressed between the second cam and a bottom of the hollow portion of the frame member. During the assembly of the hinge connector, the first slit, the second slit, and the third slit are also aligned with the fourth slit and the fifth slit to let the flexible conductive element pass through. During the rotation of the frame member relative to the second shaft member, the lower surface of the second cam is capable of discontinuously sliding on the top surface of the first cam to position the frame member relative to the second shaft member.

Further scope of the applicability of the present invention will become apparent from the detailed description given hereinafter. However, it should be understood that the detailed description and specific examples, while indicating preferred embodiments of the invention, are given by way of illustration only, since changes and modifications within the spirit and scope of the invention will become apparent to those skilled in the art from this detailed description.

BRIEF DESCRIPTION OF THE APPENDED DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The present invention provides a hinge connector for a folding-type electronic apparatus, wherein the hinge connector can rotate in two degrees of freedom. The spirit and feature of the present invention will be described in detail by the following preferred embodiments.

Figure 1A:
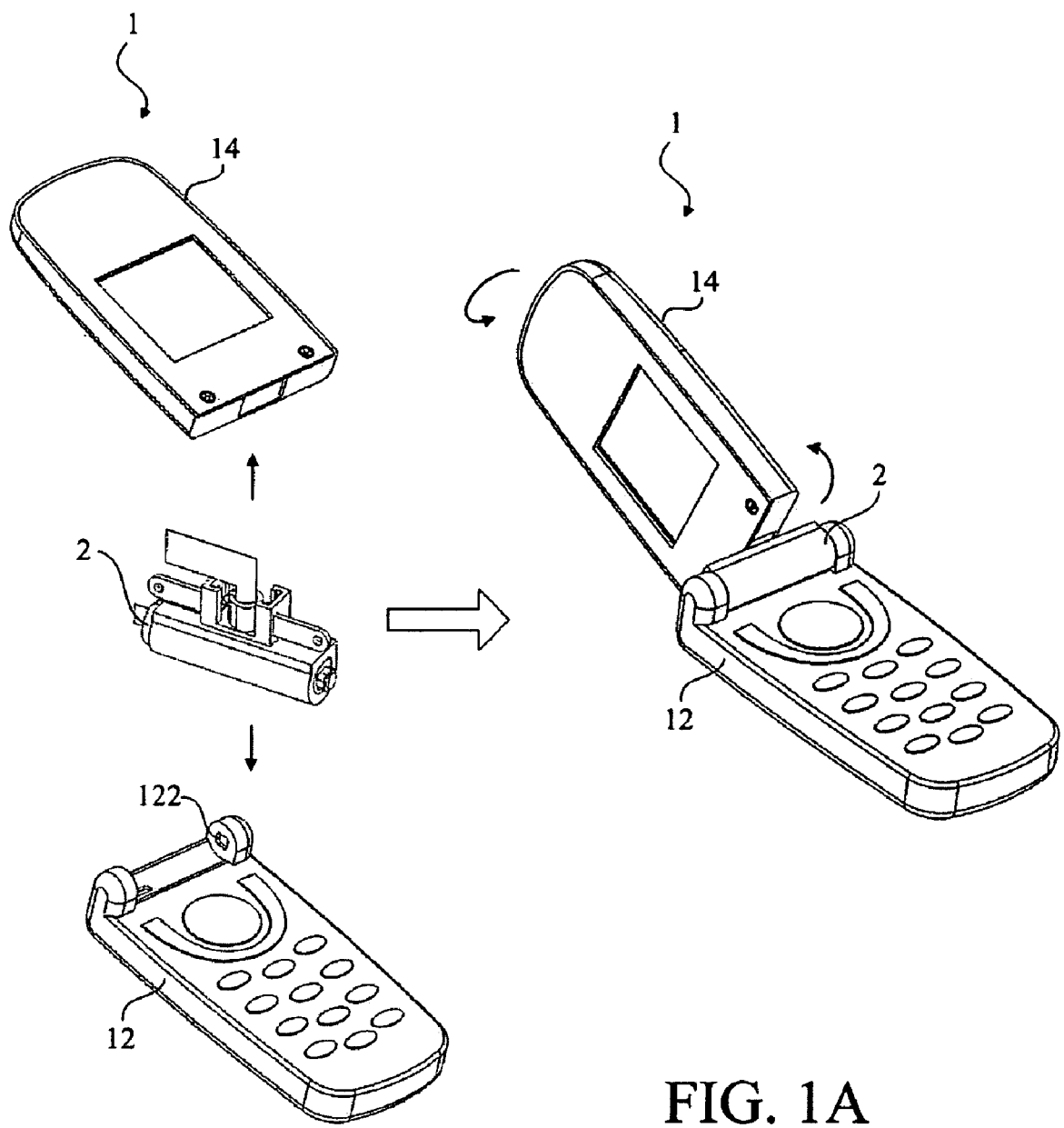
FIG. 1A shows that, according to the first preferred embodiment of the present invention, a hinge connector assists a second housing of a folding-type electronic apparatus to connect with a first housing of the folding-type electronic apparatus, and when the assembly of the folding-type electronic apparatus is completed, the second housing can rotate around two axes of the first housing.

Referring to FIGS. 1A through 1D, a hinge connector 2 is shown in the figures according to a first preferred embodiment of the present invention. As shown in FIG. 1A, the hinge connector 2 is applied to a folding-type electronic apparatus 1. FIG. 1A is a schematic diagram of a mobile phone as the folding-type electronic apparatus. The folding-type electronic apparatus 1 comprises a first housing 12, a second housing 14, a first electronic unit (not shown) disposed in the first housing 12, and a second electronic unit (not shown) disposed in the second housing 14. The first housing 12 and the first electronic unit form the main module of the folding-type electronic apparatus 1. The second housing 14 and the second electronic unit form the folder module of the folding-type electronic apparatus 1. As shown in FIG. 1A, the second housing 14 connects with the first housing 12 via the hinge connector 2, such that the second housing 14 is rotatable around the two axes relative to the first housing 12. Due to the hinge connector 2, the first electronic unit of the main module is electronically connected to the second electronic unit of the folder module.

Figure 1B:
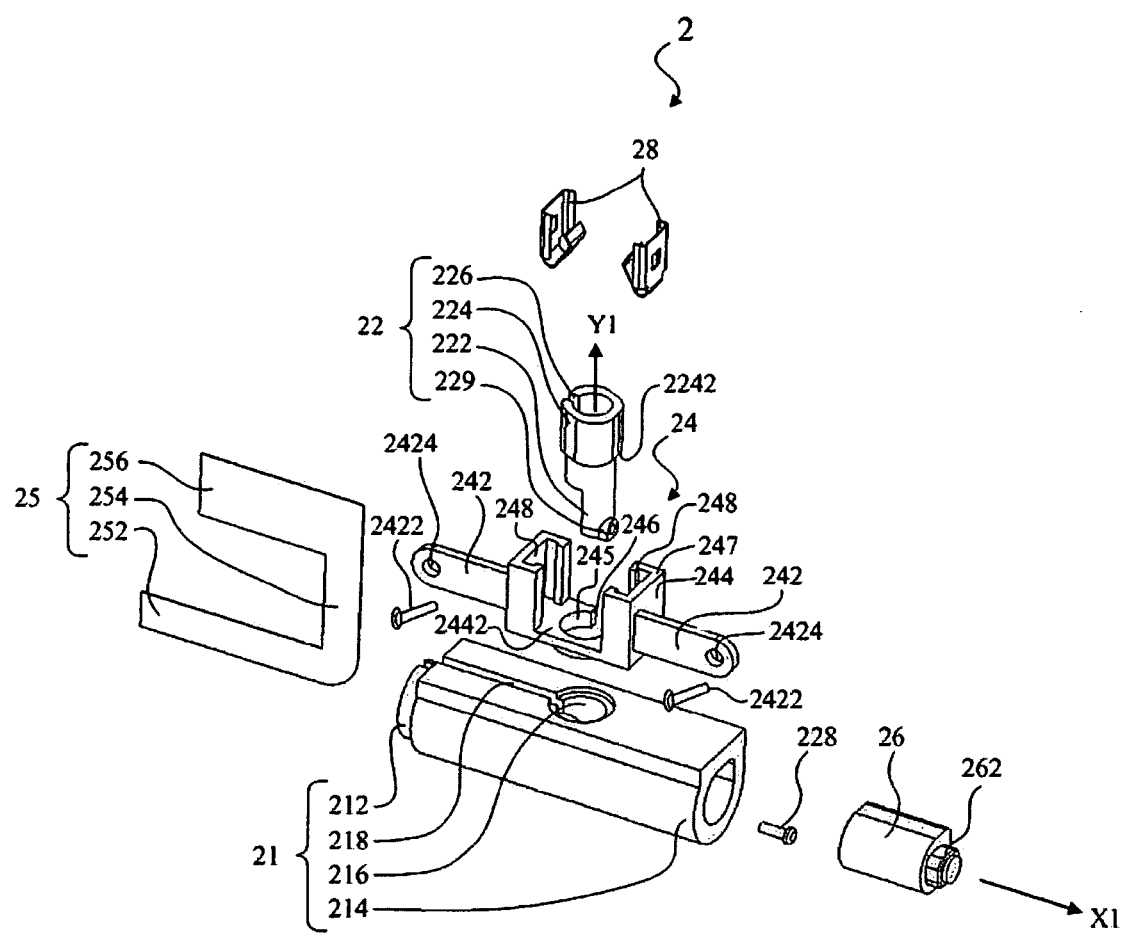
FIG. 1B is a blown up view of the hinge connector of a first preferred embodiment according to the present invention.

Referring to FIG. 1B, FIG. 1B is a blown up view of the hinge connector 2. The hinge connector 2 comprises a first substantially hollow shaft member 21, a second hollow shaft member 22, a frame member 24, and a flexible conductive element 25.

The first shaft member 21 has a first end 212, a second end 214, an opening 216, and a first formed-through slit 218. The first slit 218 extends from the opening 216 to the first end 212 of the first shaft member 21. The first shaft member 21 is pivotally attached onto the first housing 12, such that the first shaft member 21 is rotatable around a first axis X1 relative to the first housing 12.

The second shaft member 22 has a third end 222, a fourth end 224, and a second formed-through slit 226. The second slit 226 extends from the third end 222 to the fourth end 224 of the second shaft member 22. The second shaft member 22 is, via the third end 222 thereof, inserted in the opening 216 and mounted onto the first shaft member 21. As shown in FIG. 1B, the third end 222 of the second shaft member 22 may be fixed in the opening 216 of the first shaft member 21 by a screw 228, and a screw hole 229 is provided on the third end 222 of the second shaft member 22 to mate with the screw 228.

The frame member 24 has a supporting portion 242 and a hollow portion 244. A hole 245, which is adapted to an external diameter of the second shaft member 22, and a third formed-through slit 246 are formed on the hollow portion 244 of the frame member 24. The frame member 24 is, via the supporting portion 242, mounted onto the second housing 14.

As shown in FIG. 1B, the supporting portion 242 of the frame member 24 is fixed onto the second housing 14 by two screws 2422 that mates with two screw holes 2424 thereon.

The second shaft member 22 is inserted through of the hole 245 of the frame member 24 to make the frame member 24 rotatably attached onto the second shaft member 22, such that the second housing 14 together with the frame member 24 are rotatable around a second axis Y1 relative to the second shaft member 22.

The flexible conductive element 25 has a first portion 252, a second portion 254, and a third portion 256. In an embodiment, the flexible conductive element 25 is a FPCB or a coaxial cable. For practical use, the flexible conductive element 25 is an electronic member corresponding to the industry standard and does not need to be specially designed or manufactured.

Figure 1C:
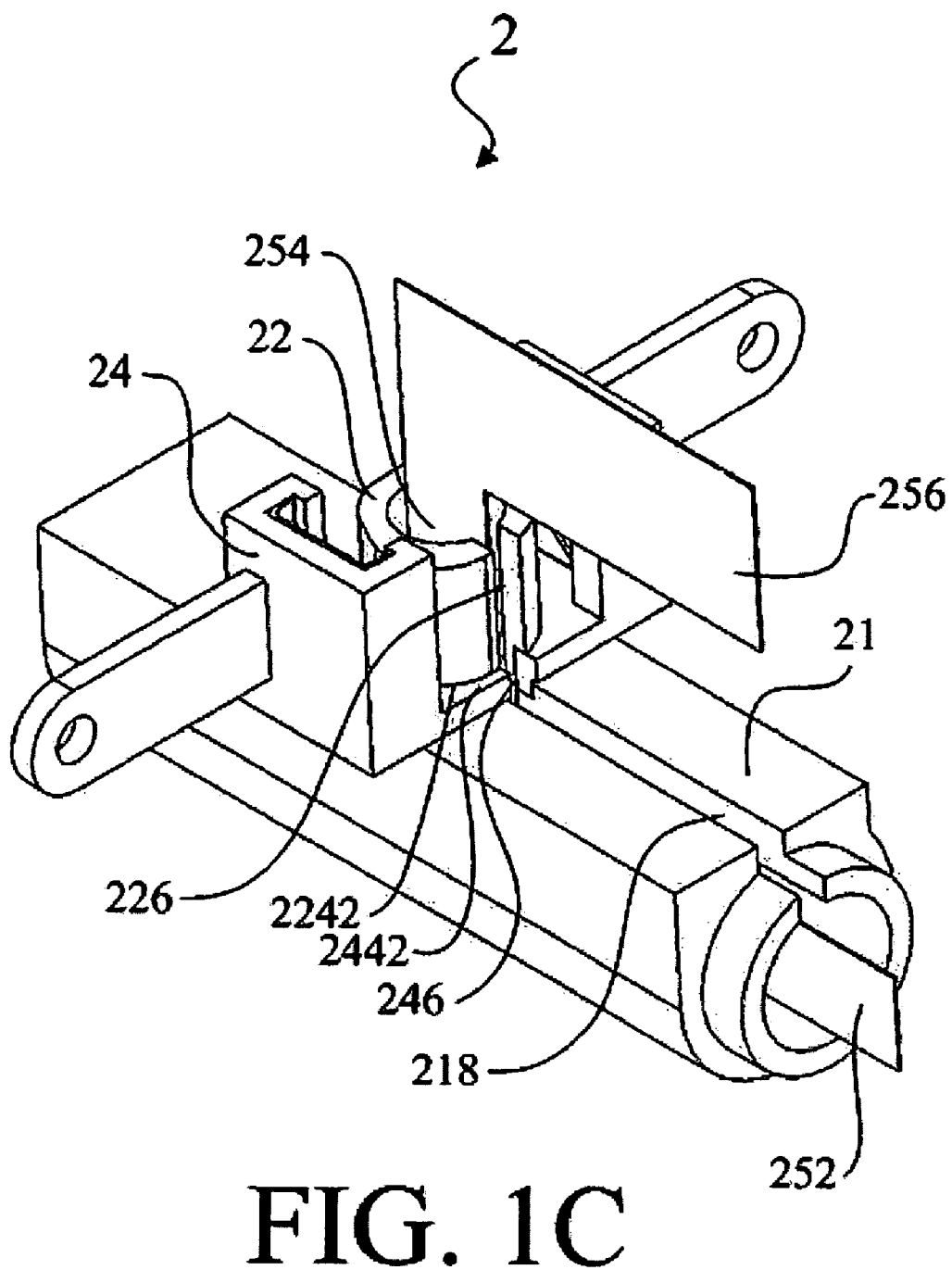
FIG. 1C is a schematic diagram of the assembly of the hinge connector of the first preferred embodiment according to the present invention.

It needs to be noticed that during the assembly of the hinge connector 2, the first slit 218 is aligned with the second slit 226 and the third slit 246 to let the flexible conductive element 25 pass through the first slit 218, the second slit 226 and the third slit 246, as shown in FIG. 1C. Then, the second portion 254 of the flexible conductive element 25 is disposed within the first shaft member 21 and the second shaft member 22. The first portion 252 of the flexible conductive element 25 is exposed outside the first shaft member 21 and disposed in the first housing 12 to provide the first electronic unit with electrical connection. The third portion 256 of the flexible conductive element 25 is exposed outside the second shaft member 24 and disposed in the second housing 14 to provide the second electronic unit with electrical connection. Accordingly, during the operation of the electronic apparatus 1, the second portion 254 of the flexible conductive element 25 within the first shaft member 21 and the second shaft member 22 is twisted rather than bent. In other words, the flexible conductive element 25 receives twisting stress rather than destructive bending stress.

As shown in FIG. 1B, the hinge connector 2 further comprises a hinge member 26 mounted onto the second end 214 of the first shaft member 21. The hinge member 26 has a pivot 262, wherein the first housing 12 has a first recess 122 (shown in FIG. 1A) mating the pivot 262 of the hinge member 26. The pivot 262 of the hinge member 26 is received by the first recess 122 of the first housing 12 and is capable of discontinuously rotating relative to the first recess 122 to position the first shaft member 21 relative to the first housing 12.

Figure 1D:
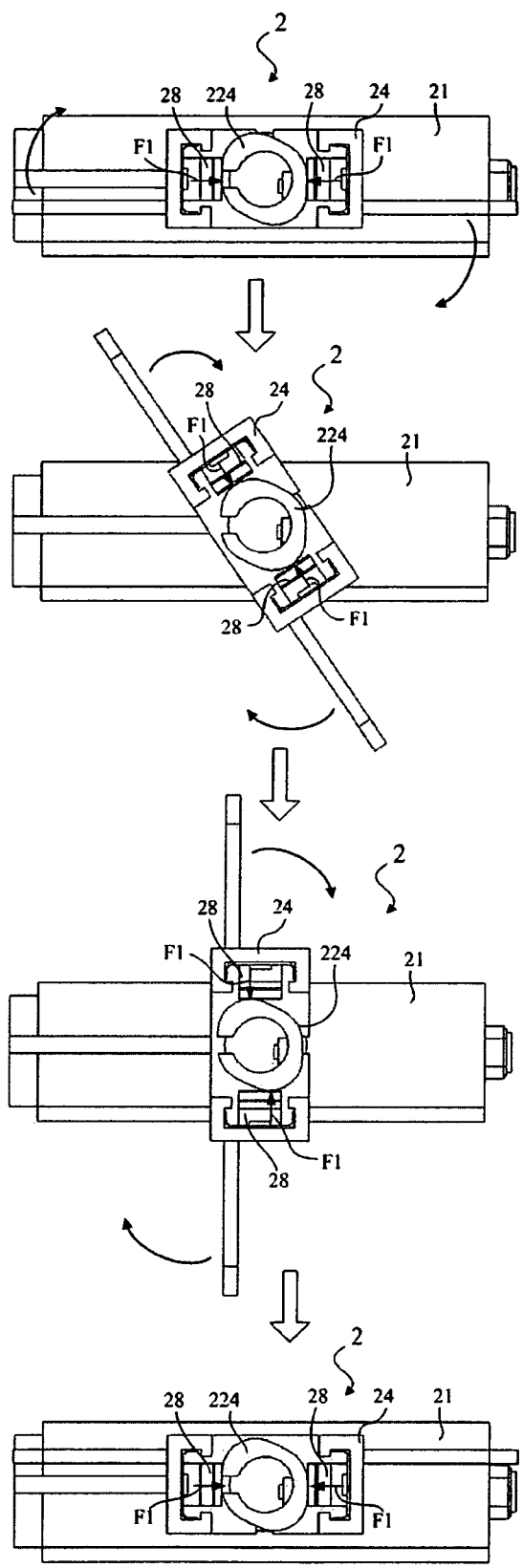
FIG. 1D shows, during the rotation of the frame member of the hinge connector relative to the second shaft member of the hinge connector, how the direction of one pair of opposite action forces, which is generated by one pair of resilient members of the hinge connector, changes.

The same as shown in FIG. 1B, the fourth end 224 of the second shaft member 22 is made in a form of a cam. The frame member 24 has an opening 247 and two slots 248 disposed on two opposite inner walls thereof. The cam 224 is disposed through the opening 247 of the hollow portion 244 and within the hollow portion 244 of the frame member 24. The hinge connector 2 further comprises one pair of resilient members 28 respectively inserted in the two slots 248 and resiliently pressing against a profile of the cam 224, such that the pair of resilient members 28 induces one pair of opposite action forces F1 on the profile of the cam 224, as shown in FIG. 1D. It needs to be noticed that the pair of opposite action forces F1 is vertical to the second axis Y1. During the rotation of the frame member 24 relative to the second shaft member 22, the pair of opposite action forces F1 are applied in alternately coaxial or non-coaxial to position the frame member 24 relative to the second shaft member 22.

As shown in FIG. 1B, the cam on the fourth end 224 of the second shaft member 22 provides a shoulder 2242 for abutting against a bottom 2442 of the hollow portion 244 of the frame member 24. The situation of the cam 224 abutting against the bottom 2442 of the hollow portion 244 of the frame member 24 is shown in FIG. 1C.

Obviously, according to the present invention, the assembly of the hinge connector 2 of the first preferred embodiment is quite easy. Accordingly, the manufacturing cost of the folding-type electronic apparatus is reduced.

Figure 2A:
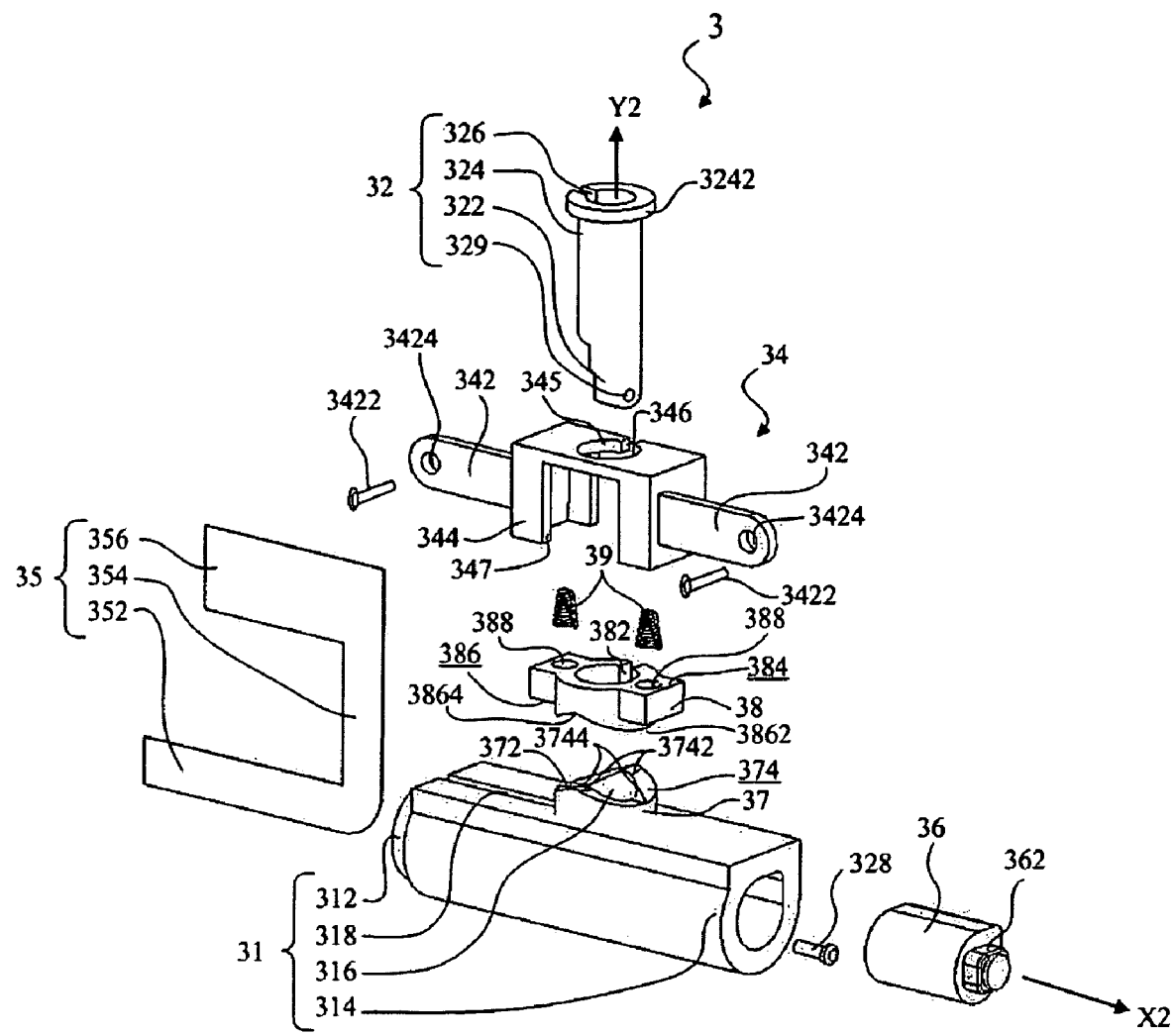
FIG. 2A is a blown up view of the hinge connector of a second preferred embodiment according to the present invention.
Figure 2B:
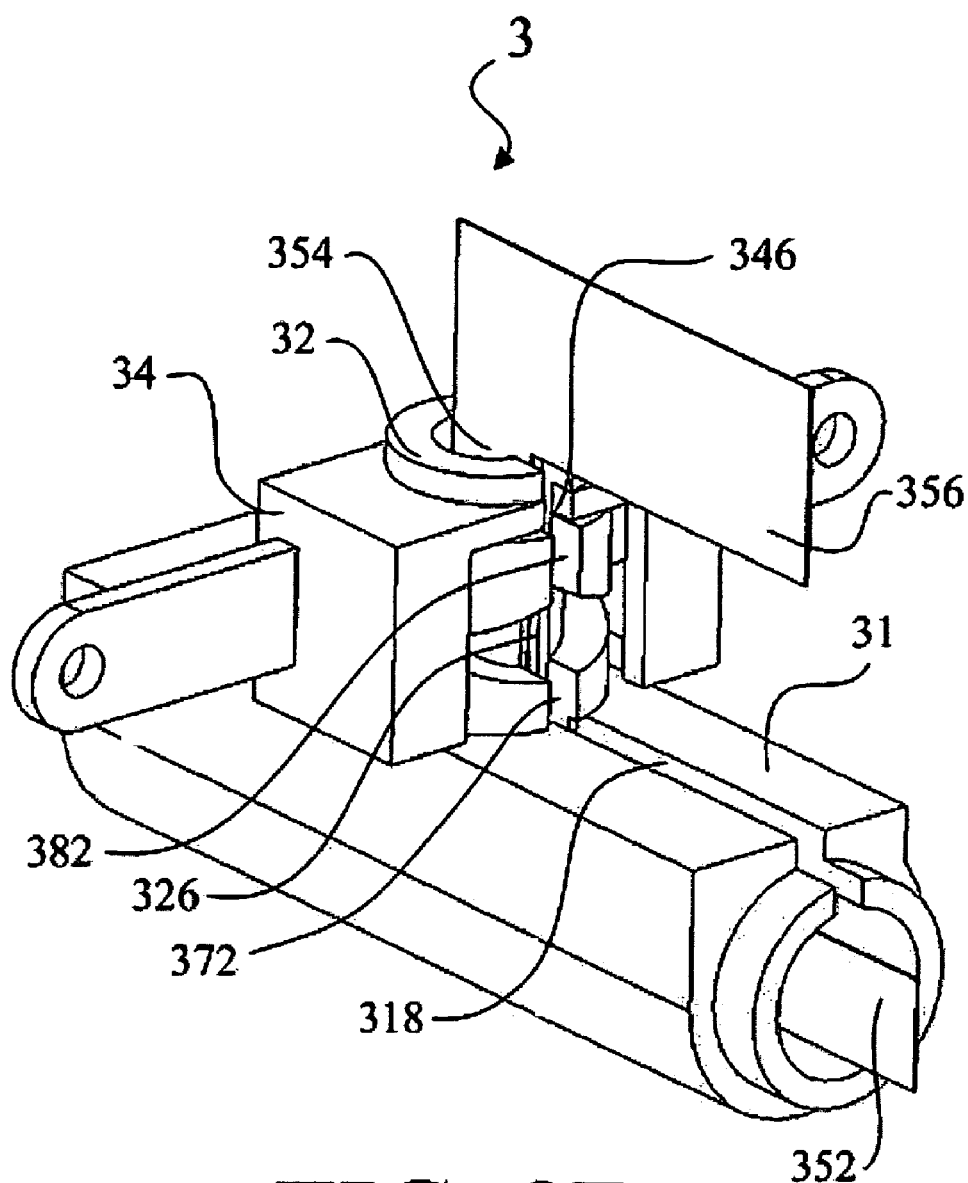
FIG. 2B is a schematic diagram of the assembly of the hinge connector of the second preferred embodiment according to the present invention.
Figure 2C:
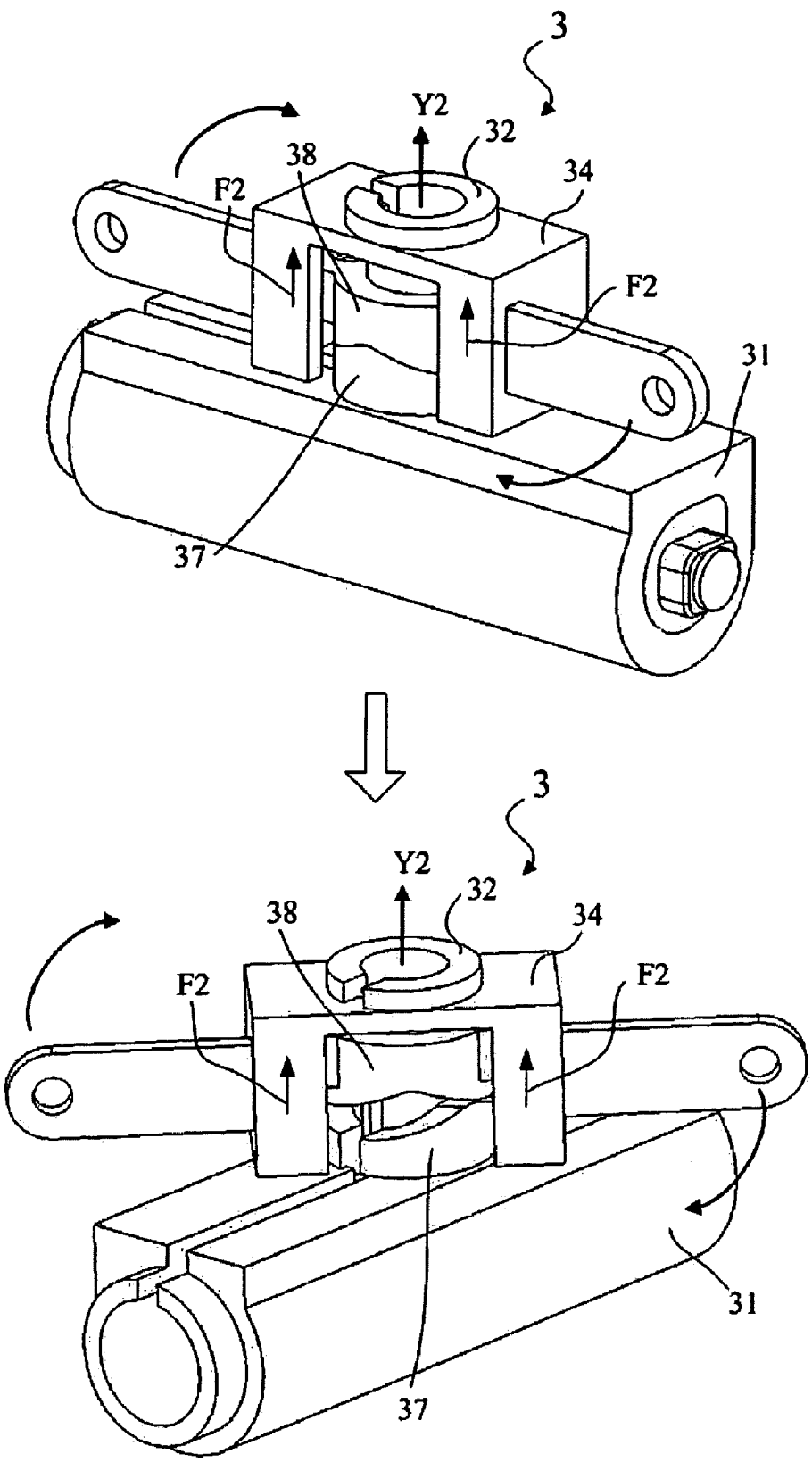
FIG. 2C shows, during the rotation of the frame member of the hinge connector relative to the second shaft member of the hinge connector, how the resilient members provide an elastic force due to compression.

Referring to FIG. 2A through 2C, a hinge connector 3 is shown in the figures according to a second preferred embodiment of the present invention. The hinge connector 3 is also applied to a folding-type electronic apparatus (not shown). The functions of the hinge connector 3 for the folding-type electronic apparatus is the same as the above mentioned first preferred embodiment and will not be described in detail again.

Referring to FIG. 2A, FIG. 2A is a blown up view of the hinge connector 3. The hinge connector 3 comprises a first substantially hollow shaft member 31, a second hollow shaft member 32, a frame member 34, and a flexible conductive element 35.

The first shaft member 31 has a first end 312, a second end 314, an opening 316, and a first formed-through slit 318. The first slit 318 extends from the opening 316 to the first end 312 of the first shaft member 31. The first shaft member 31 is pivotally attached onto a first housing of the folding-type electronic apparatus, such that the first shaft member 31 is rotatable around a first axis X2 relative to the first housing.

The second shaft member 32 has a third end 322, a fourth end 324, and a second formed-through slit 326. The second slit 326 extends from the third end 322 to the fourth end 324 of the second shaft member 32. The second shaft member 32 is, via the third end 322 thereof, inserted in the opening 316 and mounted onto the first shaft member 31. As shown in FIG. 2A, the third end 322 of the second shaft member 32 may be fixed in the opening 316 of the first shaft member 31 by a screw 328, and a screw hole 329 is provided on the third end 322 of the second shaft member 32 to mate with the screw 328.

The frame member 34 has a supporting portion 342 and a hollow portion 344. A hole 345, which is adapted to an external diameter of the second shaft member 32, and a third formed-through slit 346 are formed on the hollow portion 344 of the frame member 34. The frame member 34 is, via the supporting portion 342, mounted onto a second housing of the folding-type electronic apparatus. As shown in FIG. 2A, the supporting portion 342 of the frame member 34 is fixed onto the second housing by the screw 3422 mating with the screw hole 3424 thereon.

The second shaft member 32 is inserted through the hole 345 of the frame member 34 to make the frame member 34 rotatably attached onto the second shaft member 32, such that the second housing together with the frame member 34 are rotatable around a second axis Y2 relative to the second shaft member.

The flexible conductive element 35 has a first portion 352, a second portion 354, and a third portion 356. In an embodiment, the flexible conductive element 35 is a FPCB or a coaxial cable. For practical use, the flexible conductive element 35 is an electronic member that meets the industry standard, so it does not need to be specially designed or manufactured.

The same as the first preferred embodiment, during the assembly of the hinge connector 3, the first slit 318 is aligned with the second slit 326 and the third slit 346 to let the flexible conductive element 35 pass through the first slit 318, the second slit 326 and the third slit 346, as shown in FIG. 2B. Then, the second portion 354 of the flexible conductive element 35 is disposed within the first shaft member 31 and the second shaft member 32. The first portion 352 of the flexible conductive element 35 is exposed outside the first shaft member 31 and disposed in the first housing to provide the first electronic unit disposed in the first housing with electrical connection. The third portion 356 of the flexible conductive element 35 is exposed outside the second shaft member 32 and disposed in the second housing to provide the second electronic unit disposed in the second housing with electrical connection. Accordingly, during the operation of the electronic apparatus, the second portion 354 of the flexible conductive element 35 within the first shaft member 31 and the second shaft member 32 is twisted rather than bent. In other words, the flexible conductive element 35 receives twisting stress rather than destructive bending stress.

As shown in FIG. 2A, the hinge connector 3 further comprises a hinge member 36 mounted onto the second end 314 of the first shaft member 31. The hinge member 36 has a pivot 362, wherein the first housing has a first recess (not shown) mating the pivot 362 of the hinge member 36. The pivot 362 of the hinge member 36 is received by the first recess of the first housing and is capable of discontinuously rotating relative to the first recess to position the first shaft member 31 relative to the first housing.

The same as shown in FIG. 2A, the hinge connector 3 further comprises a first hollow cam 37, a second hollow cam 38, and at least one resilient member 39.

The first cam 37 is disposed on the opening 316 of the first shaft member 31. The first cam 37 has a fourth formed-through slit 372 and a top surface 374, on which staggered N peaks 3742 and N valleys 3744 are provided, wherein N is a natural number.

The second cam 38 has a fifth formed-through slit 382, a top surface 384, on which at least one second recess 388 is provided, and a lower surface 386 on which N peaks 3862 and N valleys 3864 is provided for mating the valleys 3744 and peaks 3742 on the top surface 374 of the first cam 37. The second cam 38 via, the lower surface 386 thereof, contacts the top surface 374 of the first cam 37 and is disposed on the first cam 37.

Each of the resilient members 39 is disposed in one of the second recess 388. As shown in FIG. 2A, two springs are taken as an example to represent the number of the resilient members 39.

The first cam 37 together with the second cam 38 are disposed through the opening of the hollow portion 344 of the frame member 34 and within the hollow portion 344 of the frame member 34. The resilient members 39 are compressed between the second cam 38 and a bottom of the hollow portion 344 of the frame member 34. In other words, the compressed resilient members 39 may impose an elastic force F2 to the frame member 34 and the second cam 38. Compared with the first preferred embodiment, the elastic force F2 provided by the compressed resilient members 39 is horizontal to the second axis Y2.

During the assembly of the hinge connector 3, the first slit 318, the second slit 326, and the third slit 346 are also aligned with the fourth slit 372 and the fifth slit 382 to let the flexible conductive element 35 pass through the first slit 318, the second slit 326, the third slit 346, the fourth slit 372, and the fifth slit 382, as shown in FIG. 2B.

During the rotation of the frame member 34 relative to the second shaft member 32, the lower surface 386 of the second cam 38 is capable of discontinuously sliding on the top surface 384 of the first cam 37 to position the frame member 34 relative to the second shaft member 32.

In an embodiment, the first cam 37 is monolithically formed with the first shaft member 31, as shown in FIG. 2A.

In an embodiment, the second shaft member 32 has a block portion 3242, formed on the fourth end 324 thereof, for abutting against a top surface of the hollow portion 344 of the frame member 34.

Therefore, obviously, according to the present invention, the assembly of the hinge connector 3 of the second preferred embodiment is also quite easy. Accordingly, the manufacturing cost of the folding-type electronic apparatus is reduced.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A hinge connector for an electronic apparatus, having a first housing, a second housing, a first electronic unit disposed in the first housing, and a second electronic unit disposed in the second housing, said hinge connector comprising:
   a first substantially hollow shaft member having a first end, a second end, an opening, and a first formed-through slit extending from the opening to the first end of the first shaft member, the first shaft member being pivotally attached onto the first housing such that the first shaft member is rotatable around a first axis relative to the first housing;
   a second hollow shaft member having a third end, a fourth end, and a second formed-through slit extending from the third end to the fourth end of the second shaft member, the second shaft member being, via the third end thereof, inserted in the opening and mounted onto the first shaft member;
   a frame member having a supporting portion and a hollow portion, a hole adapted to an external diameter of the second shaft member and a third formed-through slit formed, being formed on the hollow portion, the frame member being, via the supporting portion, mounted onto the second housing, the second shaft member being inserted through the hole of the frame member to make the frame member attached onto the second shaft member in a rotatable way, such that the second housing together with the frame member are rotatable around a second axis relative to the second shaft member;
   a flexible conductive element having a first portion, a second portion and a third portion, wherein the first portion of the flexible inductive element is exposed outside the first shaft member and disposed in the first housing to provide the first electronic unit with electrical connection, and the third portion of the flexible conductive element is exposed outside the second shaft member and disposed in the second housing to provide the second electronic unit with electrical connection; and
   whereby during the operation of said electronic apparatus, the second portion of the flexible conductive element, which is disposed within the first shaft member and the second shaft member, is twisted rather than bent.

2. The hinge connector of claim 1, wherein during the assembly of said hinge connector, the first slit being aligned with the second slit and the third slit to let the flexible conductive element pass through the first slit, the second slit, and the third slit; then the second portion of the flexible conductive element is disposed within the first shaft member and the second shaft member.

3. The hinge connector of claim 2, further comprising a hinge member mounted onto the second end of the first shaft member, the hinge member having a pivot, wherein the first housing has a first recess mating the pivot of the hinge member, the pivot of the hinge member is received by the first recess and capable of discontinuously rotating relative to the first recess to position the first shaft member relative the first housing.

4. The hinge connector of claim 3, wherein the flexible conductor is one selected from the group consisting of a flexible printed circuit board and a coaxial cable.

5. The hinge connector of claim 4, wherein the fourth end of the second shaft member is made in a form of a cam, the hollow portion of the frame member has an opening and two slots disposed on two opposite inner walls thereof, the cam is disposed through the opening of the hollow portion and within the hollow portion of the frame member, said hinge connector further comprises one pair of resilient members respectively inserted in die two slots of the frame member and resiliently urging against a profile of the cam, such that the pair of resilient members induce one pair of opposite action forces on the profile of the cam, during the rotation of the frame member relative to the second shaft member, the pair of opposite action forces are alternately in coaxial or in non-coaxial to position the frame member relative to the second shaft member.

6. The hinge connector of claim 5, wherein the cam on the fourth end of the second shaft member provides a shoulder for abutting against a bottom of the hollow portion of the frame member.

7. The hinge connector of claim 4, further comprising:
a first hollow cam disposed on the opening of the first shaft member, the first cam having a fourth formed-through slit and a top surface on which staggered N peaks and N valleys are provided, wherein N is a natural number;
a second hollow cam having a fifth formed-through slit, a top surface, on which at least one second recess is provided, and a lower surface on which N peaks and N valleys for mating the valleys and peaks on the top surface of the first cam, the second cam via the power surface thereof contacting the top surface of the first cam and being disposed on the first cam;
at least one resilient member of which each is disposed in one of the second recess; and
wherein the first cam together with the second cam are disposed through the opening of the hollow portion and within the hollow portion of the frame member, the at least one resilient member is compressed between the second cam and a bottom of the hollow portion of the frame member, during the assembly of said hinge connector, the first slit, the second slit and the third slit re also aligned with the fourth slit and the fifth slit to let the flexible conductive element pass through, during the rotation of the frame member relative to the second shaft member, the lower surface of the second cam is capable of discontinuously sliding on the top surface of the first cam to position the frame member relative to the second shaft member.

8. The hinge connector of claim 7, wherein the first cam is monolithically formed with the first shaft member.

9. The hinge connector of claim 8, wherein the second shaft member has a block portion formed on the fourth end thereof for abutting against a top surface of the hollow portion of the frame member.

10. A hinge connector for an electronic apparatus, having a first housing, a second housing, a first electronic unit disposed in the first housing, and a second electronic unit disposed in the second housing, said hinge connector comprising:
a first substantially hollow shaft member having a first end, a second end, an opening, and a first formed-through slit extending from the opening to the first end of the first shaft member, the first shaft member being pivotally attached onto the first housing such that the first shaft member is rotatable around a first axis relative to the first housing;
a second hollow shaft member having a third end, a fourth end, and a second formed-through slit extending from the third end to the fourth end of the second shaft member, the second shaft member being via the third end thereof inserted in the opening and mounted onto the first shaft member, wherein the second housing is mounted on the second shaft member; and
a flexible conductive element having a first portion, a second portion and a third portion, wherein the first portion of the flexible conductive element is exposed outside the first shaft member and disposed in the first housing to provide the first electronic unit with electrical connection, the second portion of the flexible conductive element is disposed within the first shaft member and the second shaft member, and the third portion of the flexible conductive element is exposed outside the second shaft member and disposed in the second housing to provide the second electronic unit with electrical connection.

11. The hinge connector of claim 10, further comprising a hinge member mounted onto the second end of the first shaft member, the hinge member having a pivot, wherein the first housing has a first recess mating the pivot of the hinge member, the pivot of the hinge member is received by the first recess and capable of discontinuously rotating relative to the first recess to position the first shaft member relative to the first housing.

12. The hinge connector of claim 11, further comprising a frame member having a supporting portion and a hollow portion, a hole adapted to an external diameter of the second shaft member being formed on the hollow portion, the frame member being, via the supporting portion, mounted onto the second housing, the second shaft member being inserted through the hole of the frame member to make the frame member rotatably attached onto the second shaft member such that the second housing together with frame member are rotatable around a second axis relative to the second shaft member, wherein during the operation of said electronic apparatus, the second portion of the flexible conductive element within the first shaft member and the second shaft member is twisted rather than bent.

13. The hinge connector of claim 12, wherein, a third formed-through slit is formed on the hollow portion of the frame member, during the assembly of said hinge connector, the first slit is aligned with the second slit and the third slit to let the flexible conductive element pass through the first slit, the second slit and the third slit, and then the second portion of the flexible conductive element is disposed within the first shaft member and the second shaft member.

14. The hinge connector of claim 13, wherein the flexible conductor is one selected from the group consisting of a flexible printed circuit board and a coaxial cable.

15. The hinge connector of claim 14, wherein the fourth end of the second shaft member is made in a form of a cam, the hollow portion of the frame member has an opening and two slots disposed on two opposite inner walls thereof, the cam is disposed through the opening of the hollow portion and within the hollow portion of the frame member, said hinge connector further comprises one pair of resilient members respectively inserted in the two slots of the frame member and resiliently urging against a profile of the cam such that the pair of resilient members induce one pair of opposite action forces on the profile of the cam, during the rotation of the frame member relative to the second shaft member, the pair of opposite action forces are alternately in coaxial or in non-coaxial to position the frame member relative to the second shaft member.

16. The hinge connector of claim 15, wherein the cam on the fourth end of the second shaft member provides a shoulder for abutting against a bottom of the hollow portion of the frame member.

17. The hinge connector of claim 14, further comprising:
a first hollow cam disposed on the opening of the first shaft member, the first cam having a fourth formed-through slit and a top surface on which staggered N peaks and N valleys are provided, wherein N is a natural number;
a second hollow cam having a fifth formed-through slit, a top surface, on which at least one second recess is provided, and a lower surface on which N peaks and N valleys for mating the valleys and peaks on the top surface of the first cam, the second cam via the lower surface thereof contacting the top surface of the first cam and being disposed on the first cam;
at least one resilient member which each is disposed in one of the second recess; and wherein the first cam together with the second cam are disposed through the opening of the hollow portion and within the hollow portion of the frame member, the at least one resilient member is compressed between the second cam and a bottom of the hollow portion of the frame member, during the assembly of said hinge connector, the first slit, the second slit and the third slit are also aligned with the fourth slit and the fifth slit to let the flexible conductive element pass through, during the rotation of the frame member relative to the second shaft member, the lower surface of the second cam is capable of discontinuously sliding on the top surface of the first cam to position the frame member relative to the second shaft member.

18. The hinge connector claim 17, Wherein the first cam is monolithically formed with the first shaft member.

19. The hinge connector of claim 18, wherein the second shaft member has a block portion formed on the fourth end thereof for abutting against a top surface of the hollow portion of the frame member.

* * * * *